United States Patent
Blazquez Egea et al.

(10) Patent No.: US 12,312,932 B2
(45) Date of Patent: May 27, 2025

(54) SUBSEA FACILITY AND METHOD FOR PROCESSING GAS FROM A SUBSEA GAS PRODUCTION FIELD

(71) Applicant: SAIPEM S.A., Montigny le Bretonneux (FR)

(72) Inventors: Christian Blazquez Egea, Courbevoie (FR); Paul Roland, Paris (FR)

(73) Assignee: SAIPEM S.A., Montigny le Bretonneux (FR)

( * ) Notice: Subject to any disclaimer, the term of this patent is extended or adjusted under 35 U.S.C. 154(b) by 0 days.

(21) Appl. No.: 18/692,035

(22) PCT Filed: Sep. 14, 2022

(86) PCT No.: PCT/FR2022/051729
§ 371 (c)(1),
(2) Date: Mar. 14, 2024

(87) PCT Pub. No.: WO2023/047041
PCT Pub. Date: Mar. 30, 2023

(65) Prior Publication Data
US 2024/0392674 A1    Nov. 28, 2024

(30) Foreign Application Priority Data
Sep. 22, 2021 (FR) ...................................... 2109979

(51) Int. Cl.
*E21B 43/36* (2006.01)
*B01D 45/12* (2006.01)
*B01D 46/00* (2022.01)

(52) U.S. Cl.
CPC .............. *E21B 43/36* (2013.01); *B01D 45/12* (2013.01); *B01D 46/003* (2013.01)

(58) Field of Classification Search
CPC ........ E21B 43/36; B01D 45/12; B01D 46/003
See application file for complete search history.

(56) References Cited

U.S. PATENT DOCUMENTS

| 6,048,376 A | 4/2000 | Miller |
| 6,251,168 B1 | 6/2001 | Birmingham et al. |

(Continued)

FOREIGN PATENT DOCUMENTS

| EP | 3202482 A1 | 8/2017 |
| RU | 118408 U1 * | 7/2012 |

(Continued)

OTHER PUBLICATIONS

French Search Report from corresponding French Patent Application No. FR2109979, May 27, 2022.

(Continued)

*Primary Examiner* — Aaron L Lembo
(74) *Attorney, Agent, or Firm* — Workman Nydegger

(57) ABSTRACT

A facility and a method for processing gas from a subsea gas production field, includes a cooling module supplied with a gas/liquid mixture coming directly from at least one subsea gas field, and a gas/liquid separation module which delivers processed gas to a gas export pipeline and liquid to a liquid export pipeline. The gas/liquid separation module includes a gas/liquid separator and a coalescing filter separator which are connected in series. The gas/liquid separator has a gas outlet connected to an inlet of the coalescing filter separator and a liquid outlet connected to the liquid export pipeline. The coalescing filter separator having a gas outlet connected to the gas export pipeline and a liquid outlet connected to the liquid export pipeline.

14 Claims, 2 Drawing Sheets

(56) References Cited

U.S. PATENT DOCUMENTS

| | | | | |
|---|---|---|---|---|
| 7,828,865 | B2* | 11/2010 | Hodges | F01M 13/04 |
| | | | | 55/435 |
| 10,561,974 | B2* | 2/2020 | Steiner | B01D 50/20 |
| 10,786,780 | B2* | 9/2020 | Kaasa | C10L 3/107 |
| 2009/0139403 | A1 | 6/2009 | Darke et al. | |
| 2011/0056379 | A1* | 3/2011 | Lucas | F04C 29/026 |
| | | | | 96/216 |
| 2019/0381423 | A1 | 12/2019 | Collins | |
| 2023/0173424 | A1* | 6/2023 | Chang | B01D 46/442 |
| | | | | 55/484 |

FOREIGN PATENT DOCUMENTS

| | | | |
|---|---|---|---|
| WO | 2014079515 | A1 | 5/2014 |
| WO | 2015181386 | A2 | 12/2015 |
| WO | 2016192813 | A1 | 12/2016 |

OTHER PUBLICATIONS

International Search Report from corresponding PCT Application No. PCT/FR2022/051729, Jan. 12, 2023.

* cited by examiner

SUBSEA FACILITY AND METHOD FOR PROCESSING GAS FROM A SUBSEA GAS PRODUCTION FIELD

TECHNICAL FIELD

The present invention pertains to the general field of subsea gas production. It relates more specifically to the subsea processing of gas with a view to its export to offshore or onshore facilities.

PRIOR ART

In current configurations, the export of gas from subsea production fields, and in particular from gas condensate fields, is carried out in part by long pipes connecting the production fields to surface facilities.

Gas export facilities used in practice generally do not include any processing units. The gas produced is typically exported through a pipe without prior processing (apart from the addition of chemicals to avoid solid deposits, limit corrosion, etc.). Also known are the publications WO 2015/181386, WO 2016/192813 and WO 2014/079515 concerning gas export facilities which comprise in particular a cooling module supplied with a gas/liquid mixture coming directly from the gas fields, and a gas/liquid separation module which allows to separate gas from liquid to convey them to surface facilities via dedicated export pipelines.

This type of facility is subject to various issues that need to be addressed. One of the main problems encountered is the accumulation of liquid which can occur in the low points of the pipe of the gas export pipeline. This problem occurs when the gas velocity becomes insufficient to entrain the liquid and causes plugged flows in the gas export pipeline. Another issue is ensuring that the pressure of the exported gas always remains sufficient to allow efficient export to surface facilities. It is still important to limit, or even avoid, the formation of solid deposits (hydrates, paraffins, etc.) in the gas export pipeline.

PRESENTATION OF THE INVENTION

The main object of the present invention is therefore to propose a subsea processing facility which allows to overcome the problems mentioned above.

This purpose is achieved thanks to a facility for processing gas from a submarine gas production field, comprising:
  a cooling module supplied with a gas/liquid mixture coming directly from at least one subsea gas field in order to cool the gas to a temperature allowing the heavy hydrocarbons and water present in the mixture to be condensed; and
  a gas/liquid separation module supplied with a gas/liquid mixture coming from the cooling module and which delivers processed gas to a gas export pipeline and liquid to a liquid export pipeline;
  and in which, in accordance with the invention, the gas/liquid separation module comprises a gas/liquid separator and a coalescing filter separator which are connected in series, the gas/liquid separator having a gas outlet which is connected to an inlet of the coalescing filter separator and a liquid outlet which is connected to the liquid export pipeline, the coalescing filter separator having a gas outlet which is connected to the gas export pipeline and a liquid outlet which is connected to the liquid export pipeline.

The gas processing facility according to the invention is remarkable in particular in that its gas/liquid separation module comprises a gas/liquid separator mounted in series with a coalescing filter separator, which gives it high separation performance. More generally, the facility according to the invention is based on lowering the dew point of the gas/liquid mixture by combining a cooling module and a high-performance gas/liquid separation module, which can allow a passive gas export (that is to say without the need for a compressor). Such a facility thus finds a particularly advantageous application to gas fields located at great depth and far from the shore. Furthermore, the lowering of the dew point of the gas/liquid mixture is carried out to a level subsequently allowing an export of the gas which remains totally (or almost totally) in the gas phase throughout the export.

More particularly, the cooling module of the facility according to the invention allows to condense the heavy hydrocarbons and the water present in the gas/liquid mixture which would normally condense in the gas export pipeline. Cooling also takes place at a temperature lower than that reached by the gas in the gas export pipeline.

The cooling module may comprise a passive heat exchanger or an active heat exchanger. In this case, it may further comprise a Joule-Thomson effect valve or a turboexpander installed downstream of the heat exchanger.

The gas/liquid separator of the gas/liquid separation module can be a gravity separator or a cyclonic separator or a centrifugal separator.

Preferably, the gas/liquid separation module further comprises a gas pre-processing unit disposed between the gas/liquid separator and the coalescing filter separator in order to eliminate solid particles which could be entrained with the gas and also to reduce the liquid content before the coalescing filter separator, aiming at prolonging the service life of the coalescing filter separator.

The coalescing filter separator can be integrated into the gas/liquid separator.

The gas export pipeline can advantageously be devoid of gas compression means.

As for the liquid export pipeline, it can advantageously be equipped with liquid pumping means.

Preferably, the gas/liquid separation module comprises two coalescing filter separators installed in parallel in order to ensure redundancy in the event of a problem with one of the separators and to ensure continuity of production during phases of maintenance of the coalescing filters.

Also preferably, the facility further comprises means for injecting a hydrate formation inhibitor upstream of the cooling module and/or means for injecting a paraffin inhibitor upstream of the cooling module. These injection means allow to limit, or even avoid, the formation of solid deposits (hydrates, paraffins, etc.) in the facility as well as in the gas and liquid export pipelines.

Correlatively, the invention also relates to a method for subsea processing of gas from a subsea gas production field, comprising successively:
  a step of cooling the gas/liquid mixture coming directly from at least one subsea gas production field so as to condense the heavy hydrocarbons and the water and to bring the gas/liquid mixture to a temperature lower than that of the gas in a gas export pipeline; and
  a subsea gas/liquid separation step for delivering processed gas to a gas export pipeline and liquid to a liquid export pipeline; and in which
  the gas/liquid separation step comprises a first gas/liquid separation step followed directly by a second gas/liquid separation step by coalescence in order to lower the dew point of the processed gas to a level allowing its export in monophasic form.

The invention also relates to an application of the method as defined above to a gas condensate field currently being exploited or to a gas condensate field not yet exploited.

DESCRIPTION OF EMBODIMENTS

The invention relates to the subsea processing of gas from a subsea gas production field. It finds a preferred (but not limited) application to subsea gas condensate fields located at great depths and far from the shore.

Figure 1:
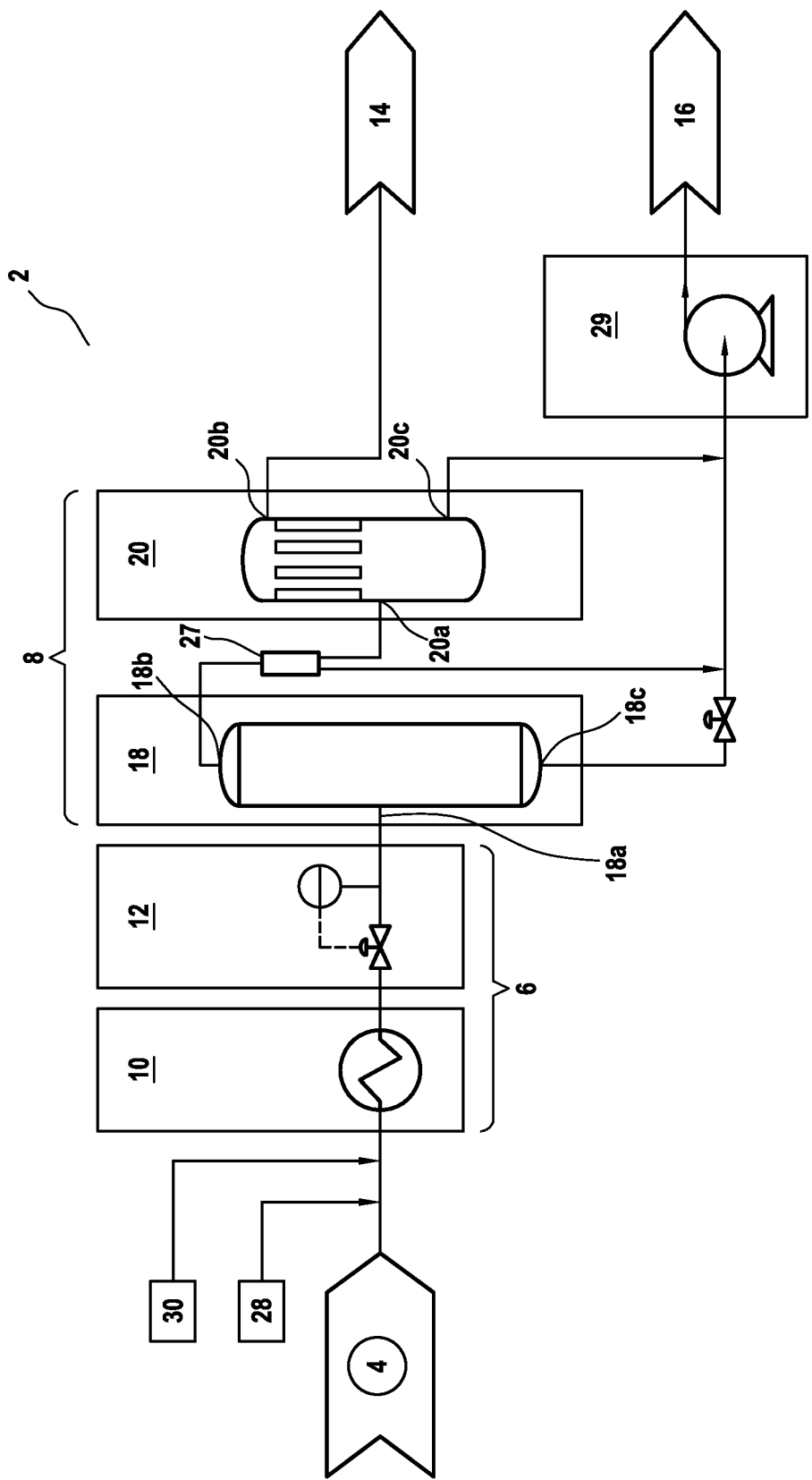
FIG. 1 is a schematic view of a subsea gas processing facility according to the invention.

FIG. 1 shows an example of a subsea gas processing facility 2 according to the invention supplied by one or more subsea gas production fields 4.

Typically, this gas processing facility 2 comprises a cooling module 6 which is supplied with a gas/liquid mixture coming directly from the subsea gas field(s) 4, and a gas/liquid separation module 8 which is supplied with a gas/liquid mixture coming from the cooling module.

In particular, the cooling module 6 has the function of cooling the gas/liquid mixture to bring it to a temperature allowing the heavy hydrocarbons and water present in the mixture to condense (and which would normally condense further downstream in the gas export pipeline).

To this end, the cooling module 6 of the exemplary embodiment of FIG. 1 comprises a passive heat exchanger 10 whose inlet is directly connected to the outlet of the wellhead facilities of the gas subsea field(s) 4, and a Joule-Thomson effect valve 12 positioned at the outlet of the passive heat exchanger 10.

The Joule-Thomson effect valve 12 is controlled so as to obtain a constant and predetermined pressure at the outlet of the gas export pipeline (usually this type of valve is controlled in order to maintain a determined temperature at the valve outlet). Knowing the features of the gas export pipeline, it is possible to control the pressure downstream of the Joule-Thomson effect valve. Incidentally, by ensuring a certain level of gas pressure at the outlet of the gas export pipeline, a maximum temperature is ensured at the outlet of the Joule-Thomson effect valve 12.

Alternatively, to the passive heat exchanger, provision can be made of an active heat exchanger, optionally associated with a Joule-Thomson effect valve downstream. This active heat exchanger can be a liquid/gas exchanger with seawater pumping, a gas/gas exchanger with reuse of cold gas at the station outlet, an exchanger with heat transfer fluid and refrigeration loop, etc.

Alternatively, to the Joule-Thomson effect valve, provision can be made of a turbo-expander installed downstream of the passive heat exchanger (or downstream of the active heat exchanger if applicable).

The gas/liquid separation module 8 receives as input the cooled gas/liquid mixture comping from the cooling module and delivers both processed gas to a gas export pipeline 14 and liquid to a liquid export pipeline 16.

According to the invention, the gas/liquid separation module 8 comprises a gas/liquid separator 18 and a coalescing filter separator 20 which are connected in series.

More specifically, the gas/liquid separator 18 has a gas/liquid mixture inlet 18a which is connected to the outlet of the cooling module 6, a gas outlet 18b which is connected to an inlet of the coalescing filter separator 20 and a liquid outlet 18c which is connected to the liquid export pipeline 16.

As for the coalescing filter separator 20, it has an inlet 20a which is connected to the gas outlet 18b of the gas/liquid separator 18, a gas outlet 20b which is connected to the gas export pipeline 14 and at least a liquid outlet 20c which is connected to the liquid export pipeline 16.

The gas/liquid separator 18 of the gas/liquid separation module can be a gravity type separator or a cyclonic type separator or even a centrifugal type separator. For example, a vertical separator with multiple pipes could be used.

In connection with FIG. 2, an example of architecture of the coalescing filter separator 20 will now be described.

In a known manner, coalescence is the action by which the fine liquid droplets of the gas/liquid mixture created by the turbulence within the separator agglutinate to form larger droplets. This phenomenon allows better gravity separation of the liquid during the time of passage through the separator.

Figure 2:
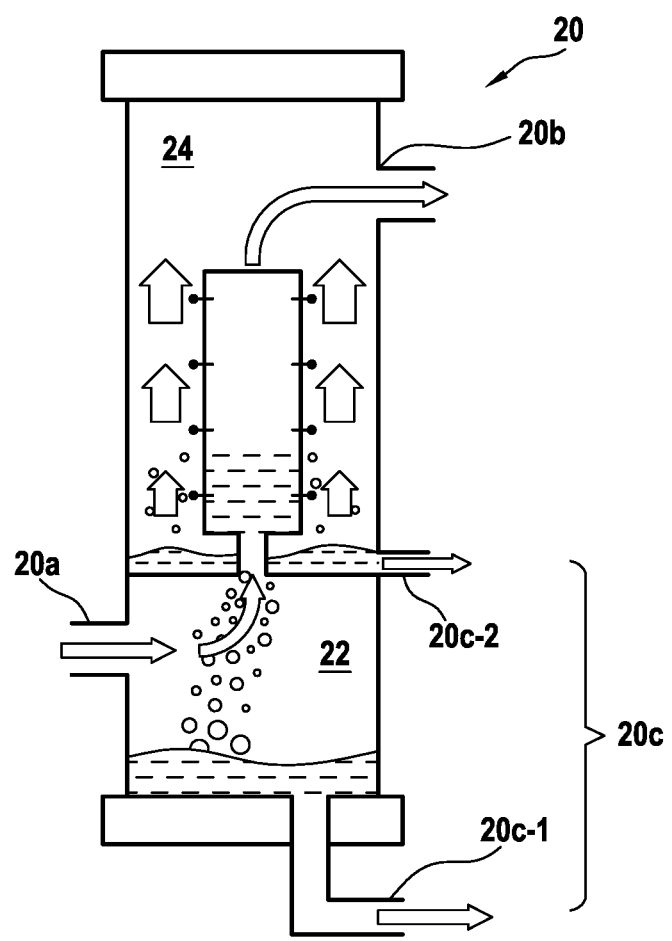
FIG. 2 is a schematic view of an example of a coalescing filter separator of the facility according to the invention.

In the exemplary embodiment of FIG. 2, the inlet 20a of the coalescing filter separator 20 is located in the lower part of the separator, the gas outlet 20b is located in the upper part of the separator, and two liquid outlets are provided, namely: an outlet in the lower part 20c-1, and an outlet in the intermediate part 20c-2.

The gas loaded with liquid droplets which enters the interior of the separator via the inlet 20a is subjected to a first phase of gravity separation in the lower part 22 of the separator. Part of the liquid resulting from this separation is evacuated through the liquid outlet in the lower part 20c-1.

The gas/liquid mixture then rises towards the upper part 24 of the separator, passing through one or more filter cartridges 26 within which the liquid droplets agglutinate to form larger droplets. The liquid droplets thus formed fall and accumulate at the bottom of the upper part 24 of the separator to be evacuated towards the outlet in the intermediate part 20c-2. As for the gas freed from these droplets of liquid, it is evacuated upwards through the gas outlet 20b.

Note that the coalescing filter separator can be an apparatus separate from the gas/liquid separator as it can be integrated therewith.

It should also be noted that the gas/liquid separation module can advantageously comprise two coalescing filter separators installed in parallel in order to ensure redundancy in the event of a breakdown.

Preferably, the gas/liquid separation module 8 further comprises a gas pre-processing unit 27 which is disposed between the gas/liquid separator 18 and the coalescing filter separator 20 in order to eliminate the solid particles which could be entrained with the gas and reduce the liquid content before the coalescing filter separator.

Also preferably, the liquid export pipeline 16 is provided with liquid pumping means, typically a subsea pump 29.

Conversely, the facility according to the invention can allow to avoid the gas export pipeline 14 having to resort to gas compression means.

More preferably, the facility further comprises means for injecting a hydrate formation inhibitor 28 upstream of the cooling module 6. Likewise, the facility can also comprise means for injecting a paraffin inhibitor 30 upstream of the cooling module.

The invention claimed is:

1. A subsea facility for processing gas from a subsea gas production field, comprising:
   a cooling module supplied with a gas/liquid mixture coming directly from at least one subsea gas field in order to cool the gas to a temperature allowing heavy hydrocarbons and water present in the mixture to be condensed; and
   a gas/liquid separation module supplied with a gas/liquid mixture coming from the cooling module and which delivers processed gas to a gas export pipeline and liquid to a liquid export pipeline;
   wherein the gas/liquid separation module comprises a gas/liquid separator and a coalescing filter separator which are connected in series, the gas/liquid separator having a gas outlet which is connected to an inlet of the coalescing filter separator and a liquid outlet which is connected to the liquid export pipeline, the coalescing filter separator having a gas outlet which is connected to the gas export pipeline and a liquid outlet which is connected to the liquid export pipeline.

2. The facility according to claim 1, wherein the cooling module comprises a passive heat exchanger or an active heat exchanger.

3. The facility according to claim 2, wherein the cooling module further comprises a Joule-Thomson effect valve or a turbo-expander installed downstream of the heat exchanger.

4. The facility according to claim 1, wherein the gas/liquid separator of the gas/liquid separation module is a gravity separator or a cyclonic separator or a centrifugal separator.

5. The facility according to claim 1, wherein the gas/liquid separation module further comprises a gas pre-processing unit disposed between the gas/liquid separator and the coalescing filter separator in order to eliminate solid particles which could be entrained with the gas and reduce liquid content before the coalescing filter separator.

6. The facility according to claim 1, wherein the coalescing filter separator is integrated into the gas/liquid separator.

7. The facility according to claim 1, wherein the gas export pipeline is devoid of gas compression means.

8. The facility according to claim 1, wherein the gas/liquid separation module comprises two coalescing filter separators installed in parallel.

9. The facility according to claim 1, further comprising means for injecting a hydrate formation inhibitor upstream of the cooling module.

10. The facility according to claim 1, further comprising means for injecting a paraffin inhibitor upstream of the cooling module.

11. A method for subsea processing of gas from a subsea gas production field, comprising successively:
    a step of cooling a gas/liquid mixture coming directly from at least one subsea gas production field so as to condense heavy hydrocarbons and water present in the gas/liquid mixture and to bring the gas/liquid mixture to a temperature lower than that of the gas in a gas export pipeline; and
    a subsea gas/liquid separation step for delivering processed gas to a gas export pipeline and liquid to a liquid export pipeline;
    wherein the gas/liquid separation step comprises a first gas/liquid separation step followed directly by a second gas/liquid separation step by coalescence in order to lower a dew point of the processed gas to a level allowing its export in monophasic form.

12. An application of the method according to claim 11 to a gas condensate field currently being exploited.

13. An application of the method according to claim 11 to a gas condensate field not yet exploited.

14. A subsea facility for processing gas from a subsea gas production field, comprising:
    a cooling module supplied with a gas/liquid mixture coming directly from at least one subsea gas field in order to cool the gas to a temperature allowing heavy hydrocarbons and water present in the mixture to be condensed; and
    a gas/liquid separation module supplied with a gas/liquid mixture coming from the cooling module and which delivers processed gas to a gas export pipeline and liquid to a liquid export pipeline;
    wherein the gas/liquid separation module comprises a gas/liquid separator and a coalescing filter separator which are connected in series, the gas/liquid separator having a gas outlet which is connected to an inlet of the coalescing filter separator and a liquid outlet which is connected to the liquid export pipeline, the coalescing filter separator having a gas outlet which is connected to the gas export pipeline and a liquid outlet which is connected to the liquid export pipeline;
    wherein the liquid export pipeline is provided with liquid pumping means.

* * * * *